UNITED STATES PATENT OFFICE.

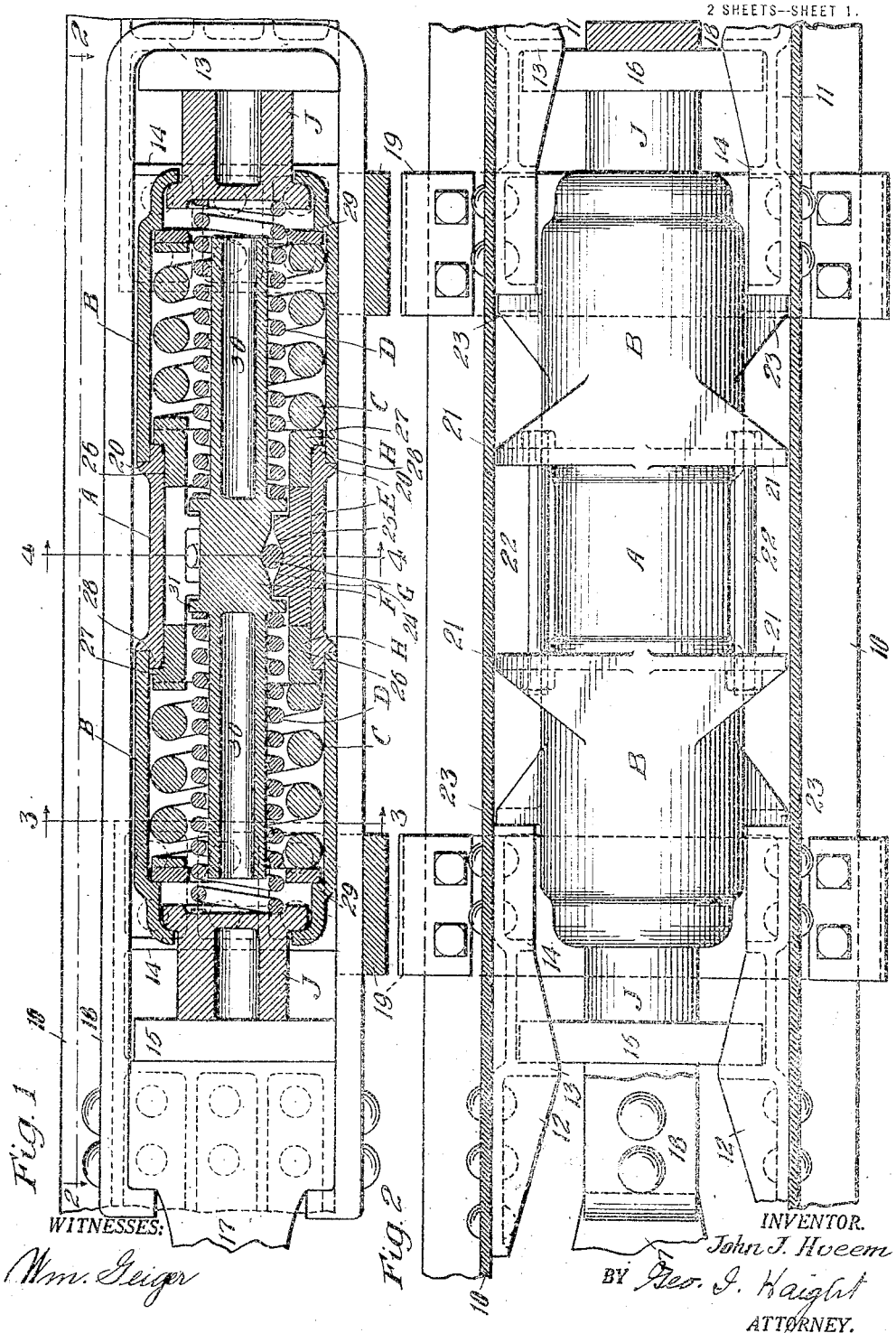

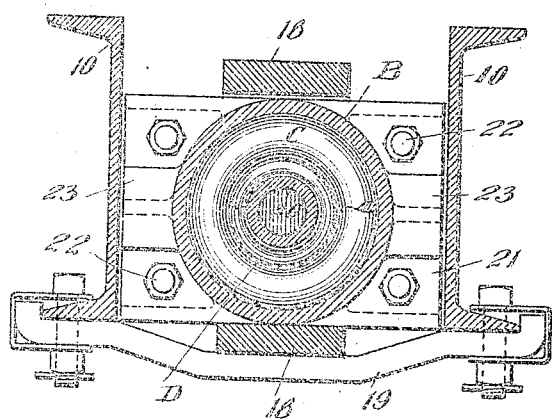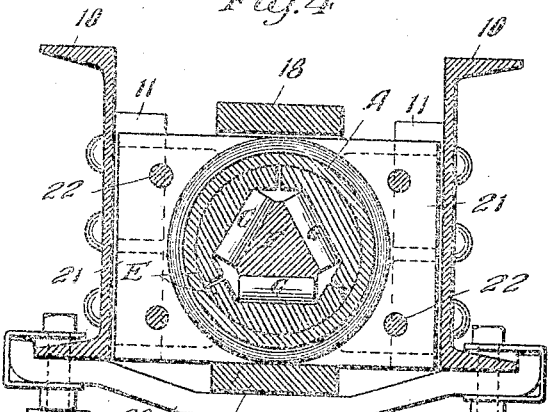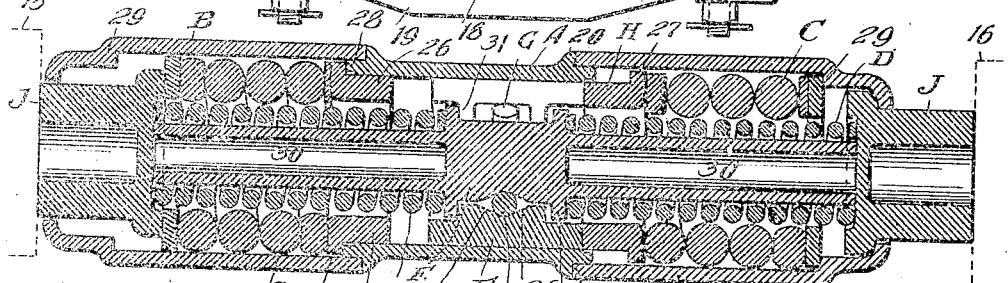

JOHN J. HVEEM, OF CHICAGO, ILLINOIS, ASSIGNOR TO WILLIAM H. MINER, OF CHAZY, NEW YORK.

COMPOUND SPRING FRICTION-GEAR.

1,282,840.

Specification of Letters Patent.

Patented Oct. 29, 1918.

Application filed February 26, 1917. Serial No. 150,989.

*To all whom it may concern:*

Be it known that I, JOHN J. HVEEM, a citizen of the United States, residing at Chicago, in the county of Cook and State of Illinois, have invented a certain new and useful Improvement in Compound Spring Friction-Gears, of which the following is a full, clear, concise, and exact description, reference being had to the accompanying drawings, forming a part of this specification.

This invention relates to improvements in compound spring friction gears.

The object of the invention is to provide a friction gear for railway draft riggings having high capacity and an easy graduated action.

In the drawing forming a part of this specification, Figure 1 is a vertical longitudinal section of a portion of a railway draft rigging showing my improvements in connection therewith. Fig. 2 is a horizontal sectional view taken substantially on the line 2—2 of Fig. 1, the upper arm of the yoke being broken away in order to more clearly illustrate the parts. Figs. 3 and 4 are vertical transverse sectional views taken on the line 3—3 and 4—4 respectively of Fig. 1. And Fig. 5 is a view similar to Fig. 1, illustrating the gear proper under full compression.

In said drawing, 10—10 denotes channel shaped center or draft sills of a railway car underframe, to which are secured rear stops 11—11 and front stops 12—12. Each of the stops 11 and 12 is provided with a main stop shoulder 13 and a corresponding limiting stop shoulder 14 with which coöperate the front and rear followers 15 and 16, respectively. The draw bar 17 is operatively connected with the gear proper, hereinafter described, by a yoke strap 18 and all the parts are supported by detachable saddle plates 19—19. All of the foregoing parts, are or may be, of standard construction.

The friction gear proper, as shown, comprises the following elements: a friction shell A, two spring casings B—B, two main springs C—C, two preliminary springs D—D, a plurality of friction shoes E coöperating with the friction cylinder, a double-acting wedge F disposed within the friction shoes, anti-friction rollers G interposed between the wedge and friction shoes, inner main spring followers H—H, and end springs followers J—J.

The friction shell A is shown of cylindrical form and the spring casings B—B are of similar form applied to the ends of the friction shell, the latter having annular shoulders 20—20 at its ends on which the spring casings are seated. The latter are provided with outstanding lugs 21—21 spaced substantially equal distances apart, the latter being connected by bolts 22—22 whereby the spring casings and friction shell form a substantially unitary and rigid structure. Each of the spring casings B—B is also provided with laterally extended shoulders 23, which engage the inner ends of the front and rear stops, as clearly illustrated in Fig. 2, whereby the shell and spring casings are held immovable with respect to the draft sills.

The friction shoes E are circularly arranged with the double-acting wedge centrally located therewithin, in a well known manner, the anti-friction rollers being interposed between the wedge and the respective friction shoes and bearing against the opposed double-acting wedge faces 24 and 25 of the wedge and friction shoes, respectively.

As clearly shown in Fig. 1, the friction shoes are considerably shorter than the friction shell A and each of the main spring followers H has an extension 26 within the friction shell bearing at its inner end against the adjacent ends of the friction shoes. Each of the followers H is also provided with an outturned annular flange 27 that engages the adjacent end 28 of the cylinder and thus limits the inward movement of the followers H with respect to the shell A. Each of the main springs C bears at its inner end against the corresponding follower H and at its outer end normally bears against an internal annular shoulder 29 provided on the corresponding spring casing B. The wedge F has formed preferably integrally therewithin on either end an elongated hollow post or thrust member 30 which extends toward the corresponding spring follower J, but is normally spaced therefrom a predetermined distance, depending upon the normal travel of the gear. Surrounding each of the posts 30 is a preliminary or light spring D, each of the latter bearing at its inner end against a shoulder 31 formed on the wedge and at its outer end against the inner face of the follower J, the latter being telescoped with respect to the corresponding spring casing B. It will be noted from an inspection of Fig. 1, that the inner ends of the followers J are normally spaced from the adjacent ends of the main or heavy coils C, which distance is less than the distance between the followers J and the adjacent ends of the posts 30. The function of this spacing will appear from the description of the operation about to follow.

Upon inward movement of the draw bar, the front follower 15 will be forced inwardly, moving the follower J therewith. This movement will be resisted at first by the front preliminary spring D until the front follower J engages the front heavy spring C. Thereafter, both front springs C and D will be compressed simultaneously until the front follower J engages the forwardly extended post 30 from the wedge. Upon continued inward movement of the draw bar and associated parts, it is apparent that the front main spring D will continue to be compressed and the wedge will then be moved rearwardly, thus actuating the friction shoes with respect to the shell A. This movement of the friction shoes is resisted by the rear heavy coil C through the rear follower H. In addition to the frictional resistance thus produced and the spring resistance of the front heavy coil C which is cumulative therewith, there will be provided the additional spring resistance of the rear inner light coil D. Upon removal of the pressure from the draw bar, it is apparent that the release of the parts will be effected by the rear light spring D acting directly on the wedge and the rear heavy coil C acting on the friction shoes. The full buff position of the parts is shown in Fig. 5. The foregoing operation under buff is similar to the operation under draft except that the rear follower J will be moved inwardly with corresponding changes in the sequence of operations of the springs and friction elements.

From the preceding description, it will be seen that the improved friction gear provides a graduated action wherein the first resistance is provided by a light coil for a predetermined distance, then the resistance is increased by the addition of a heavy straight spring resistance, for another predetermined distance, after which the spring resistances have added thereto the resistance of the friction elements. The gear thus provides not only an easy graduated action but an ultimate high capacity wherein friction and spring resistances are employed cumulatively.

I claim:

1. In a friction shock absorbing mechanism, the combination with a friction shell and friction elements coöperable therewith, of a main spring and a preliminary spring disposed at each end of the friction shell, and an end spring follower coöperable with each of the said preliminary springs, said end followers having each a preliminary spring movement for a predetermined distance resisted by the corresponding adjacent preliminary spring, each of said end followers having a further movement after the said preliminary movement and resisted by the combined action of the friction elements and all of the springs.

2. In a friction gear, the combination with a centrally disposed friction shell and friction elements including a wedge coöperable therewith, of a heavy main spring at each end of the friction shell coöperable with the friction elements, and a preliminary spring at each end of the gear, one of said latter being actuated a predetermined distance prior to the actuation of the friction elements.

3. In a friction gear, the combination with a stationary friction shell, friction shoes mounted therewithin, and a double-acting wedge coöperable with said shoes, of a heavy spring disposed at either end of the friction shoes and co-acting therewith, spring followers at each end of the gear, and a preliminary spring interposed between each of said spring followers and the double-acting wedge.

4. As an article of manufacture, a combined friction shell and spring casing comprising, a friction shell proper, a spring casing at each end thereof, the spring casings having shouldered engagement with the friction shell, and means for rigidly uniting the shell and casings.

5. In a friction gear, the combination with a stationary friction shell, friction shoes coöperable therewith, and a double-acting wedge co-acting with the shoes, said wedge having post extensions from each end thereof, of followers at each end of the gear and normally spaced from said posts, a heavy spring at each end of the friction shell and co-acting with the friction shoes, said followers being also normally spaced from said heavy springs, and a preliminary spring coöperable with each of said followers.

6. In a friction gear, the combination with a friction shell, friction shoes coöperable therewith, and a double-acting wedge mounted within the shoes, of a heavy spring and a light preliminary spring disposed at each end of the friction elements, the heavy springs being adapted to resist movement of the shoes, followers at the ends of the gear, the followers being engaged by the light springs and normally spaced from the heavy springs.

7. In a friction gear, the combination with a centrally disposed stationary friction shell, friction shoes coöperable with said shell, and a double-acting wedge disposed within the shoes, of a spring casing disposed at each end of the friction shell, each casing being internally shouldered near its outer end, a main heavy spring disposed within each casing and seated at its outer end against the shoulder of the corresponding casing, and means for compressing said springs and actuating the wedge from either end.

8. In a friction gear, the combination with a fixed friction shell, friction shoes coöperable therewith, a wedge co-acting with the shoes, the wedge being operable in either direction and having posts extending from each end thereof, of a spring casing secured to each end of the friction shell, each spring casing having an internal shoulder near its outer end, a main spring seated within each casing and engaging at its outer end the corresponding shoulder of the spring casing and at its inner end co-acting with the friction shoes, a follower telescoped with each spring casing at its outer end, and a preliminary spring disposed within each casing and extending between the corresponding follower and the wedge.

In witness that I claim the foregoing I have hereunto subscribed my name this 16th day of Feb., 1917.

JOHN J. HVEEM.